United States Patent [19]

Pritchard et al.

[11] Patent Number: 5,619,060
[45] Date of Patent: Apr. 8, 1997

[54] THERMAL PICTURE SYNTHESIZER DEVICE FOR GENERATING A THERMAL IMAGE

[75] Inventors: Alan P. Pritchard; Stephen P. Lake; Ian M. Sturland, all of Filton, Great Britain

[73] Assignee: British Aerospace Public Limited Company, Farnborough, England

[21] Appl. No.: 257,326

[22] Filed: Jun. 7, 1994

[51] Int. Cl.$^6$ ................................................ H01L 31/058
[52] U.S. Cl. .......................... 257/467; 257/468; 257/469; 257/536; 257/537; 338/22 R; 338/22 SD
[58] Field of Search ...................................... 257/444, 467, 257/468, 469, 536, 537; 250/332, 338.2, 338.3, 338.4; 338/13, 25, 22 R, 22 SD

[56] References Cited

U.S. PATENT DOCUMENTS 5,300,915  4/1994  Higashi et al. ........................ 257/467

FOREIGN PATENT DOCUMENTS 0284131  9/1988  European Pat. Off. ............... 257/467
8100645  3/1981  WIPO ................................... 257/467

Primary Examiner—Minhloan Tran
Attorney, Agent, or Firm—Cushman, Darby & Cushman IP Group of Pillsbury Madison & Sutro LLP

[57] ABSTRACT

A thermal picture synthesis device (1) of multi-layer construction has a resistor element (3) spaced from a semiconductor substrate layer (2). The resistor element (3) is made of titanium or Ni-chrome. A drive element layer (4) is provided either in or attached to the substrate layer (2) for the resistor element (3). By placing the drive element layer parallel to and spaced from the resistor element (3) it is possible to pack a plurality of resistor elements (3) into a side by side adjacent array with a high fill factor or packing density and this coupled with the use of titanium or Ni-chrome for the resistor elements (3) and the spacing of these elements from the semi-conductor substrate (2) allows the device to operate at a higher apparent temperature than is conventional.

15 Claims, 2 Drawing Sheets

5,619,060

THERMAL PICTURE SYNTHESIZER DEVICE FOR GENERATING A THERMAL IMAGE

FIELD OF THE INVENTION

This invention relates to a thermal picture synthesis device for generating a thermal image and to a method for manufacturing such a device.

BACKGROUND OF THE INVENTION

Thermal picture synthesis devices are used for generating thermal images for use in developing and testing infrared radiation sensitive electro-optical equipment. Conventionally such a device may take the form of one or more resistor elements, preferably arranged in an array, which can be heated selectively by passing electric current therethrough. By selecting the resistor elements to be heated the device can be used to produce a desired thermal image made up of pixels which correspond to the heated resistor elements.

A form of thermal picture synthesis device has been proposed which employs a resistor element in the form of a thin strip extending across a cavity formed in the surface of a supporting semi-conductor substrate. The resistor element is also made of silicon, is suspended over the cavity and is connected to drive circuitry arranged along side and coplanar with the resistor element on the semi-conductor substrate. By suspending the resistor element over a cavity it is possible to reduce the rate of loss of heat from the resistor element into and through the semi-conductor body. This allows more of the heat generated in the resistor element to be used for the thermal picture synthesis. However such a known device suffers from at least two problems which reduce the usefulness of the device.

Firstly by making the drive circuitry coplanar with the resistor elements the number of elements or pixels per unit area in an array is reduced. This reduced "fill factor" leads to a large loss of apparent temperature so that the actual perceived thermal image temperature may only be of the order of 300° Centigrade whilst the actual temperature at the resistor element is of the order of 1100° Centigrade. Secondly this large loss of apparent temperature is exacerbated by the use of a silicon resistor element which can additionally lead to a high thermal stress failure rate for the device. Because of these problems such a known form of thermal picture synthesiser device is not suitable for imaging temperatures of more than about 300° Centigrade and there is a need for a generally improved thermal picture synthesis device which is capable of operating at higher apparent temperatures, preferably up to 600° or 700° Centigrade.

OBJECTS OF THE INVENTION

Thus one object of the present invention is to provide a thermal picture synthesis device and a method of manufacturing such a device which at least minimise the foregoing problems associated with conventional devices.

This and other objects and advantages of the present invention will become more apparent from details disclosed in the following specification where preferred embodiments of the invention are described.

SUMMARY OF THE INVENTION

According to one aspect of the present invention there is provided a thermal picture synthesis device having a multilayer construction incorporating a semi-conductor substrate layer, at least one resistor member extending across and facing a first surface of said substrate layer at least partially at a spacing therefrom, and a drive element layer on a second surface of the substrate layer remote from said first surface.

Preferably the at least one resistor member is made of titanium or Ni-chrome (Trade Mark).

Conveniently the at least one resistor member is a strip arranged in serpentine fashion.

Advantageously the device includes a layer of aluminium-silicon-copper or copper forming a capping layer on the surface of the at least one resistor member most remote from the substrate layer.

Preferably the capping layer extends through the substrate layer into electrical contact with the drive element layer.

Conveniently the substrate layer includes a silicon base layer, a first silicon dioxide insulating layer facing and in contact with the silicon base layer, an aluminium-silicon-copper or copper bus layer facing and in contact with the silicon dioxide insulating layer and a second silicon dioxide layer in contact with the at least one resister member and at least partially supports the at least one resistor member.

Advantageously the drive element layer forms part of, or is integral with the silicon base layer or is attached thereto.

Preferably the substrate layer includes a polyimide insulating layer located between the second silicon dioxide insulating layer and the aluminium-silicon-copper or copper bus layer.

Conveniently the second silicon dioxide layer is cut away between the resistor member and the substrate layer to provide said spacing.

Advantageously the polyimide layer and/or the second silicon dioxide layer is/are cut away between the resistor member and the substrate layer to provide said spacing.

Advantageously the device has a plurality of resistor members arranged closely adjacent one another in a side by side coplanar array.

According to a further aspect of the present invention there is provided a method of manufacturing a thermal picture synthesis device having a multilayer construction, including the steps forming a semi-conductor substrate layer, undercutting a first surface of said substrate layer to leave exposed the desired shape in plan of at least one resistor member, providing an electrical connection passage or via through said substrate layer from the exposed desired shape region of the substrate layer first surface to a surface thereof remote from said exposed desired shape region, depositing at least one resistor member on said exposed desired shape region of said first surface of the substrate layer, undercutting at least part of the substrate layer beneath the at least one resistor member to leave said member at least partially spaced from said substrate layer first surface, and providing a drive element layer at said remote substrate surface, which drive element layer is in electrical contact through said passage or bore with the at least one resistor member.

Preferably the semi-conductor substrate layer is formed by growing a first silicon dioxide insulating layer on a silicon wafer base layer in an atmosphere of oxygen and steam at a temperature in excess of 1100° C., an aluminium-silicon-copper or copper bus layer is deposited by sputtering on said first silicon dioxide insulating layer, a desired bus bar pattern is formed on said bus layer by photolithography and etching, a polyimide insulating layer is deposited on the bus layer and a second silicon dioxide layer is deposited on the polyimide layer.

Conveniently the drive element layer is diffused into the silicon wafer base layer or is attached thereto.

Advantageously the second silicon dioxide layer is provided with a pattern, by photolithography, conforming to the desired shape in plan of the at least one resistor member, and undercut by masking and etching, to a depth greater than the thickness of the second silicon dioxide layer.

Preferably after deposition of the at least one resistor member on the desired shape undercut region of the second silicon dioxide layer, at least part of the polyimide material is removed, by etching, from beneath the at least one resistor member, with or without removal of at least one part of the second silicon dioxide layer from beneath the at least one resistor member, to provide a spacing between at least part of the at least one resistor member and the bus layer.

Conveniently the at least one resistor member is formed by deposition of titanium or Ni-chrome (Trade Mark).

DESCRIPTION OF THE DRAWINGS

For a better understanding of the present invention, and to show how the same may be carried into effect, reference will now be made, by way of example, to the accompanying drawings in which.

DESCRIPTION OF EMBODIMENTS OF THE INVENTION

Figure 1:
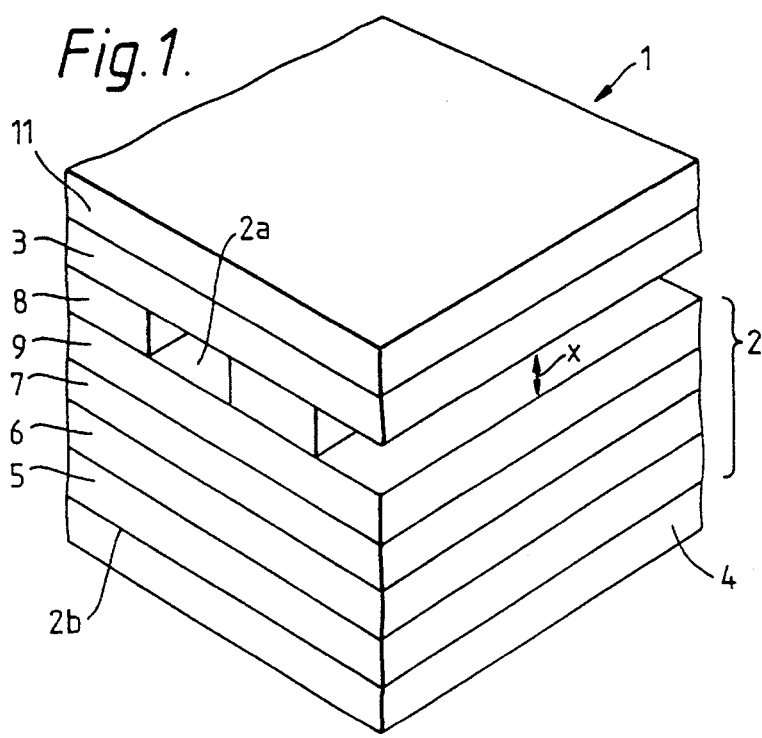
FIG. 1 is a schematic drawing of a detail of a thermal picture synthesis device according to one embodiment of the present invention shown in perspective.

A thermal picture synthesis device of the invention as shown in the accompanying drawings has a multi-layer construction. The device 1 incorporates a semi-conductor substrate layer generally indicated at 2 in FIG. 1, at least one resistor member 3 extending across and facing a first surface 2a of the substrate layer 2 at least partially at a spacing (x) therefrom and a drive element layer 4 on a second surface 2b of the substrate layer 2 remote from the first surface 2a. Each resistor member 3 is made or titanium of Ni-chrome (Trade Mark) which is capable of being heated by passing an electrical current thereto to relatively high temperature and to maintain that temperature without undue thermal loss through the substrate layer 2. The titanium or Ni-chrome resistor member 3 is capable of providing an apparent temperature in the region of 600° to 700° Centigrade. To prevent loss of heat from the resistor member 3 through the substrate layer 2 it is supported at a spacing (x) from the surface 2a of the substrate layer 2. This can be done in many different ways. The resistor member 3 is given any convenient configuration such as the squared serpentine configuration illustrated in FIG. 2 and may be supported purely at its ends 3a so that it is virtually completely suspended above the surface 2a or may be supported completely or at least partially along its length above the surface 2a as will be described in more detail hereinafter.

The substrate layer 2 includes a silicon base layer 5, a first silicon dioxide insulating layer 6 facing and in contact with the silicon base layer 5 and an aluminium-silicon-copper or copper bus layer 7 facing and in contact with the silicon dioxide insulating layer 6. The aluminium-silicon-copper alloy may have a composition by weight of 4% copper, 1% silicon, balance aluminium. A second silicon dioxide layer 8 is provided in contact with the at least one resistor member and at least partially supports the at least one resistor member 3. This can be seen from FIGS. 1 and 2 of the accompanying drawings.

Although in FIG. 1 the drive element layer 4 is shown attached to the silicon base layer 5 it may alternatively form part of or be integral with the layer 5. For example the drive elements 4 may be diffused into the silicon of the layer 5.

Preferably the substrate layer 2 includes a polyimide insulating layer 9 located between the second silicon dioxide insulating layer 8 and the bus layer 7 as is shown in FIG. 1 of the accompanying drawings. Whilst the resistor member 3 can be self supporting at its ends 3a on an electrical connection passage or bore 10 which extends through the substrate layer 2 from the member 3 to the drive element layer 4, it is possible that residual stress in the resistor member 3 could in some instances cause it to curl or otherwise undesirably deform. Hence it is preferred to support the resistor member 3 at a point or points between its two ends 3a. This can be done in various ways.

Figure 2:
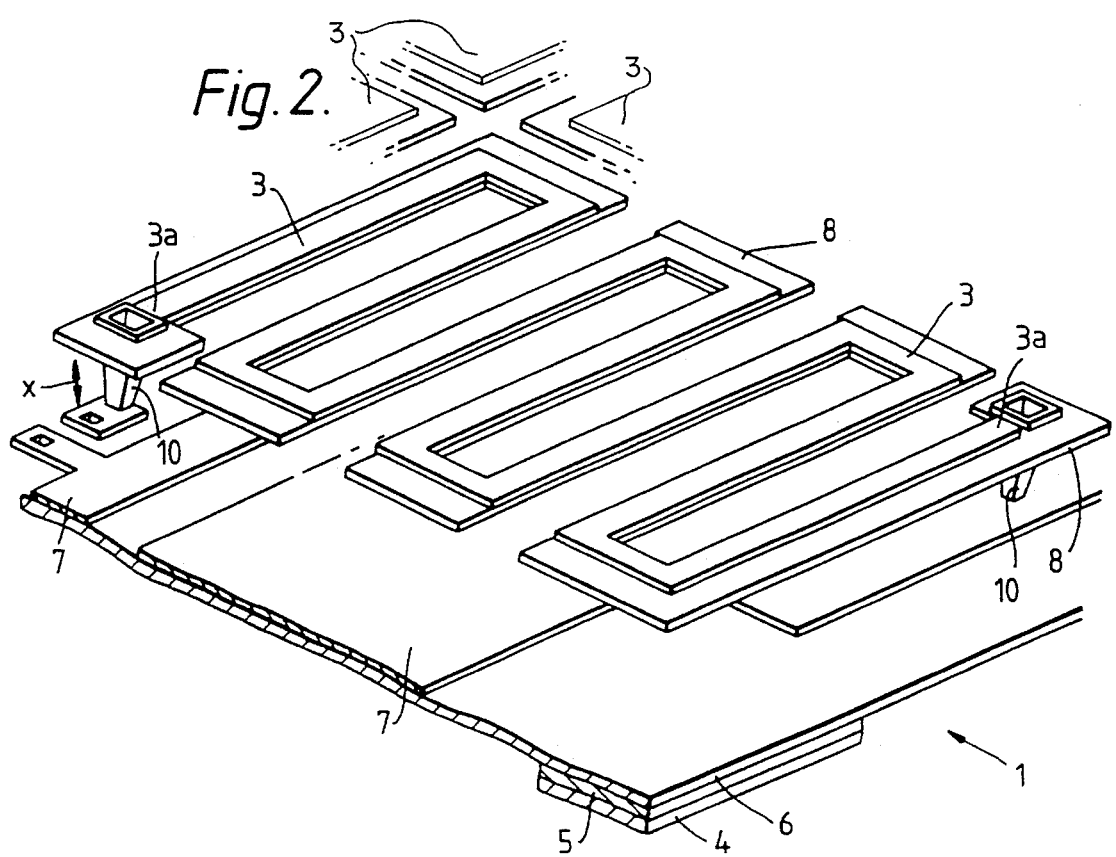
FIG. 2 is a perspective view from above, of a further embodiment of a thermal picture synthesis device according to the present invention.
Figure 3:
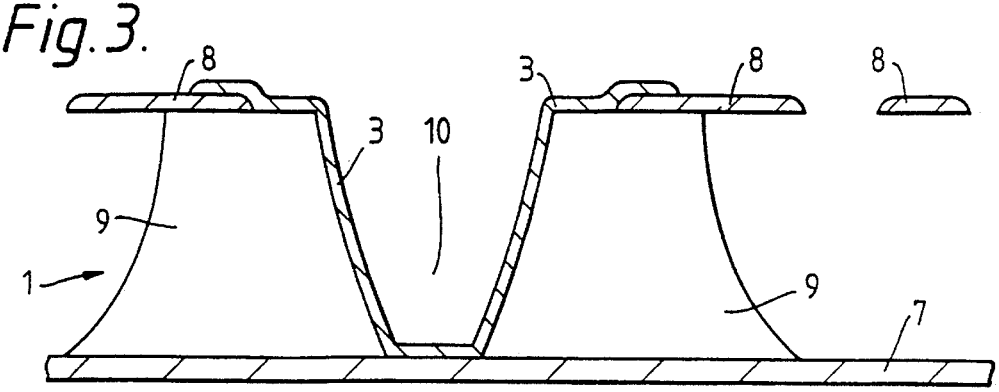
FIG. 3 is a schematic view from one edge of a detail of part of a thermal picture synthesis device according to another embodiment of the present invention.
Figure 5:
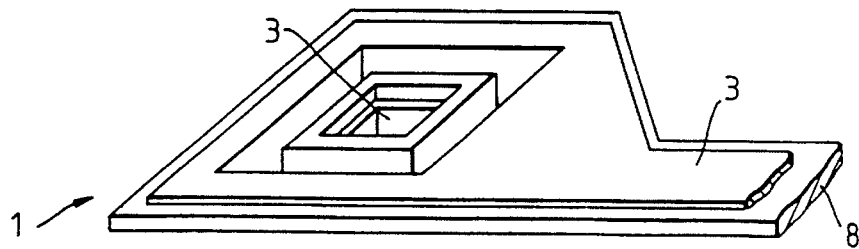
FIG. 5 is a perspective view from above of a detail of a device according to yet another embodiment of the present invention.
Figure 6:
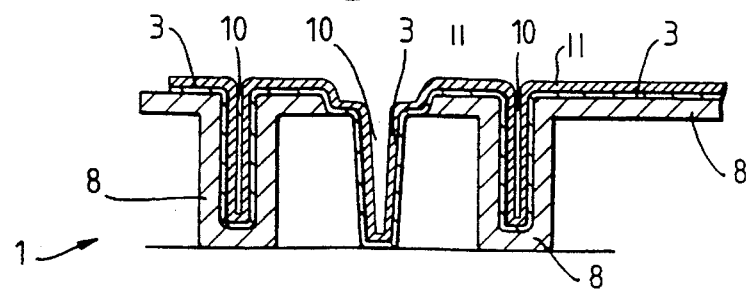
FIG. 6 is an edge on view of part of the device of FIG. 5.

For example in the FIG. 1 embodiment, the second silicon dioxide insulating layer 8 is removed in part beneath the resistor member 3 providing the space x between the member 3 and the surface 2a of the substrate layer 2. In the FIG. 2 example, the second silicon dioxide layer 8 has a shape which conforms to that of the resistor member 3 and supports the member 3 along its entire length. This can be done as shown in FIG. 3 by allowing the resistor member 3 to extend down the passage or bore 10 through the polyimide layer 9 to the bus layer 7 to provide electrical contact through to the drive element layer 4. A filet of polyimide 9 remains after etching to support the silicon dioxide layer 8. In the alternative construction shown in FIG. 4 the polyimide layer 9 is completely removed by etching so that the second silicon dioxide layer 8 hangs under the resistor member 3. This can be avoided by the construction shown in FIGS. 5 and 6 in which the vias 10 are nested with the oxide layer 8 surrounding and supporting the resistor member 3 at the via 10.

Figure 4:
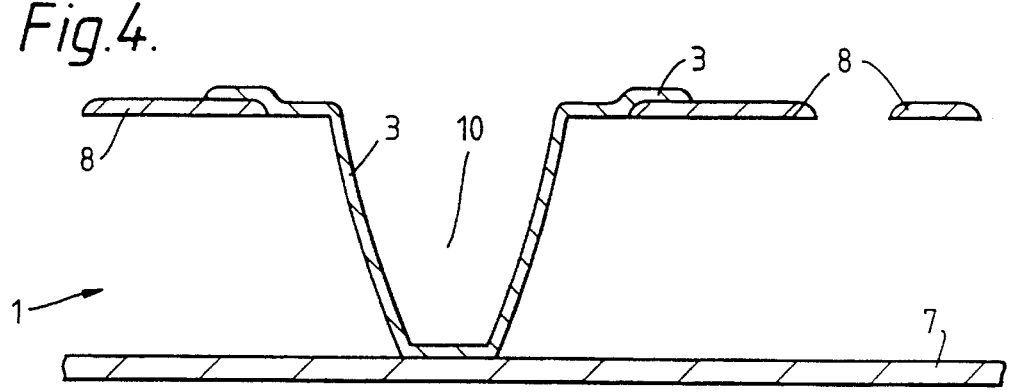
FIG. 4 is a view similar to that of FIG. 3 of a device according to a further embodiment of the present invention.

Thus in one alternative the resistor member 3 may be supported purely at its ends 3a by means of the vias 10, as shown in FIG. 4. Alternatively the resistor member 3 can be supported over its entire length by the second silicon dioxide layer 8 which in turn is supported at its ends which underlie the resistor member ends 3a, as shown in FIG. 2. Again in this alternative the second silicon dioxide layer 8 is supported at its ends under the resistor member 3a by the vias 10. This construction completely stabilises the resistor member 3. However there is a large area of oxide under the resistor member 3 which tends to increase heat capacity and lateral heat conduction. This may be avoided by an alternative construction in which the second silicon dioxide layer 8 is thinned out or removed in selected areas beneath the resistor member 3 such as to provide a supporting structure under the resistor member of criss-crossing V shaped beams.

In yet another alternative the second silicon dioxide layer 8 may be thinned out beneath the resistor member 3 to provide a grid shaped support with areas which extend at right angles to each other under the resistor member 3 so as to extend in parallel with the main runs thereof and transverse to the main runs thereof. In yet another variant the second silicon dioxide layer 8 may be removed in areas under the resistor member 3 to provide support regions only at the ends of the serpentine shape resistor member 3. This latter arrangement permits the working area of the resistor member 3 to be entirely unsupported and undercut leading to a most effective high temperature performance.

A capping layer 11 may be provided on the surface of the resistor member 3 most remote from the substrate layer 2 as shown in FIG. 1. This capping layer preferably is of aluminium-silicon-copper or copper and preferably extends through the substrate layer 2 into electrical contact with the drive element layer 4. Preferably the aluminium-silicon-copper alloy has a composition, by weight, of 4% copper, 1% silicon, balance aluminium.

Although the drive element layer 4 has been shown separate from the bus layer 7 it could be incorporated in the bus layer 7 to reduce the overall thickness of the device 1. Although in the device 1 illustrated only a single resistor member 3 has been shown for convenience it is to be understood that a practical device according to the invention will incorporate a plurality of resistor members 3 arranged closely adjacent one another in a side by side coplanar array. By placing the drive element layer beneath the resistor member 3 and not in the same plane therewith it is possible to arrange the plurality of resistor members very closely together and thus considerably increase the number of resistor elements per unit area of the array (ie the packing density or fill factor) and thereby increase the apparent temperature of the thermal picture synthesised with the device. For highest apparent temperature performance the polyimide layer 9 should be omitted or removed in total, the capping layer 11 and the bus layer 7 should be made of copper and the resistor members 3 should be made of Ni-chrome (Trade Mark). Ni-chrome can be deposited with a greater thickness than titanium to improve the strength and working life of the resistor member 3.

A thermal picture synthesis device of the present invention having a multilayer construction may be manufactured by a method which includes the following steps. In general terms the semi-conductor substrate layer 2 is formed and the surface 2a thereof undercut to leave exposed the desired shape in plan of at least one resistor member 3. The electrical connection passage or via 10 through the layer 2 is provided from the exposed desired shape region of the substrate surface 2a to the second surface 2b remote from the exposed desired shape region.

The resistor member 3 is deposited on the exposed desired shape region of the first surface 2a and at least part of the substrate layer beneath the member 3 is undercut to leave the member 3 at least partially spaced from the substrate layer surface 2a by a distance x. A drive element layer 4 is then added to the substrate 2 at the surface 2b in electrical contact through the via 10 with the resistor member 3. The substrate layer 2 is formed by growing the first silicon dioxide insulating layer 6 on a silicon wafer base layer 5 in an atmosphere of oxygen and steam at a temperature in excess of 1100° C., preferably 1150° C.

The aluminium-silicon-copper or copper bus layer 7 is deposited by sputtering on the layer 6. Alternatively the drive element layer 4 may be incorporated in the bus layer 7. The desired bus bar pattern is formed on the bus layer 7 by photolithography and etching. The polyimide layer 9 is then deposited on the bus layer 7 and the second silicon dioxide layer 8 deposited on the polyimide layer 9. The second silicon dioxide layer 8 is provided with a pattern by photolithography which conforms to the desired shape in plan of the resistor member 3 and undercut by masking and etching, to a depth greater than the thickness of the second silicon dioxide layer 8. After deposition of the resistor member 3 on the desired shape undercut region of the second silicon dioxide layer 8 at least part of the polyimide layer 9 material is removed by etching from beneath the resistor member 3 with or without removal of at least part of the second silicon dioxide layer 8 from beneath the resistor member 3. This provides a spacing x between at least part of the resistor member 3 and the bus layer 7.

Various modifications and alterations may be made to the embodiments of the present invention described and illustrated within the scope of the present invention as defined in the following claims.

What is claimed is:

1. A thermal picture synthesis device having a multilayer construction incorporating a substrate layer, at least one resistor member extending across and facing a first surface of said substrate layer at least partially at a spacing therefrom, and a drive element layer on a second surface of the substrate layer remote from said first surface, wherein the substrate layer includes a silicon base layer, a first silicon dioxide insulating layer facing and in contact with the silicon base layer, a bus layer comprising one of aluminum-silicon-copper and copper, facing and in contact with the first silicon dioxide insulating layer, a layer of at least one of aluminum-silicon-copper and copper forming a capping layer on the surface of the at least one resistor member most remote from the substrate layer, and hollow post-like electrical connection passage members located one at each end of said at least one resistor member between the at least one resistor member and the substrate layer to provide at least partial support for the at least one resistor member and with the capping layer extending through the substrate layer into electrical contact with the drive element layer to provide electrical connection between the drive element layer and the at least one resistor member.

2. A device according to claim 1, wherein the at least one resistor member comprises at least one of titanium and nickel-chromium alloy.

3. A device according to claim 2, wherein the at least one resistor member is a strip arranged in serpentine fashion.

4. A device according to claim 1, in which the substrate layer includes a second silicon dioxide layer in contact with and acting with at least partial support for the at least one resistor member.

5. A device according to claim 4, in which the drive element layer is integral with, the silicon base layer or is attached thereto.

6. A device according to claim 5, in which the substrate layer includes a polyimide insulating layer located between the second silicon dioxide insulating layer and the bus layer.

7. A device according to claim 6, in which the second silicon dioxide layer is cut away between the resistor member and the substrate layer to provide said spacing.

8. A device according to claim 7, in which at least one of the polyimide layer and the second silicon dioxide layer is cut away between the resistor member and the substrate layer to provide said spacing.

9. A device according to claim 8, having a plurality of resistor members arranged closely adjacent to one another in a side by side coplanar array.

10. A device according to claim 4, in which the drive element layer forms part of the silicon base layer or is attached thereto.

11. A device according to claim 10, in which the substrate layer includes a polyimide insulating layer located between the second silicon dioxide insulating layer and the bus layer.

12. A device according to claim 11, in which the second silicon dioxide layer is cut away between the resistor member and the substrate layer to provide said spacing.

13. A device according to claim 12, in which at least one of the polyimide layer and the second silicon dioxide layer is cut away between the resistor member and the substrate layer to provide said spacing.

14. A device according to claim 13, having a plurality of resistor members arranged closely adjacent to one another in a side by side coplanar array.

15. A thermal picture synthesis device having a multilayer construction incorporating a substrate layer, at least one resistor member extending across and facing a first surface of said substrate layer at least partially at a spacing therefrom, and a drive element layer on a second surface of the substrate layer remote from said first surface and in electrical contact with said resistor member; and hollow post-like electrical connection passage members located one at each end of said at least one resistor member between the at least one resistor member and the substrate layer to provide at least partial support for the at least one resistor member.

* * * * *